US010616068B2

(12) United States Patent
Shevenell

(10) Patent No.: US 10,616,068 B2
(45) Date of Patent: *Apr. 7, 2020

(54) IDENTIFICATION OF NETWORKING COMPONENT APPLICATION PROGRAMMING INTERFACES

(71) Applicant: CA, Inc., New York, NY (US)

(72) Inventor: Michael Paul Shevenell, Dover, NH (US)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/934,869

(22) Filed: Mar. 23, 2018

(65) Prior Publication Data
US 2018/0219745 A1 Aug. 2, 2018

Related U.S. Application Data

(63) Continuation of application No. 14/978,126, filed on Dec. 22, 2015, now Pat. No. 9,960,968.

(51) Int. Cl.
H04L 12/24 (2006.01)
G06F 9/46 (2006.01)
G06F 21/00 (2013.01)

(52) U.S. Cl.
CPC .............. *H04L 41/12* (2013.01); *G06F 9/468* (2013.01); *G06F 21/00* (2013.01); *H04L 41/0213* (2013.01)

(58) Field of Classification Search
CPC ..... H04L 41/12; H04L 41/0213; G06F 9/468; G06F 21/00
See application file for complete search history.

(56) References Cited

U.S. PATENT DOCUMENTS

2011/0010471 A1* 1/2011 Heidelberger .......... G06F 13/28 710/22
2014/0089383 A1 3/2014 Hong
2016/0239546 A1* 8/2016 Cuomo ................ G06F 16/248

* cited by examiner

Primary Examiner — Michael A Keller
(74) Attorney, Agent, or Firm — Foley & Lardner LLP

(57) ABSTRACT

Based on a request to identify a networking component, a first application programming interface (API) signature is selected from a plurality of API signatures within a priority list that associates the first API signature with a corresponding first API type, wherein the first API signature includes a first characteristic. A first API implemented by the networking component is tested to determining whether the first API implemented by the networking component exhibits the first characteristic. A determination is made of whether the networking component implements the first API type based on determining that the first API implemented by the networking component exhibits the first characteristic.

20 Claims, 9 Drawing Sheets

IDENTIFICATION OF NETWORKING COMPONENT APPLICATION PROGRAMMING INTERFACES

BACKGROUND

The disclosure generally relates to the field of computer networks, and more particularly to network component discovery.

As networking technology undergoes a paradigm shift from "standard" network components to software-defined networking (SDN) components, techniques for network component discovery will change as well. Many standard network components implement the Simple Network Management Protocol (SNMP), which provides a standard interface to query information about each of the network components. Thus, discovery of a network component that implements the SNMP may be performed by sending one or more requests defined by the SNMP. SDN components, on the other hand, may implement one of many interfaces. Discovery of SDN components may thus be more complex than discovery of standard network components.

BRIEF DESCRIPTION OF THE DRAWINGS

Aspects of the disclosure may be better understood by referencing the accompanying drawings.

DESCRIPTION

Figure 1:
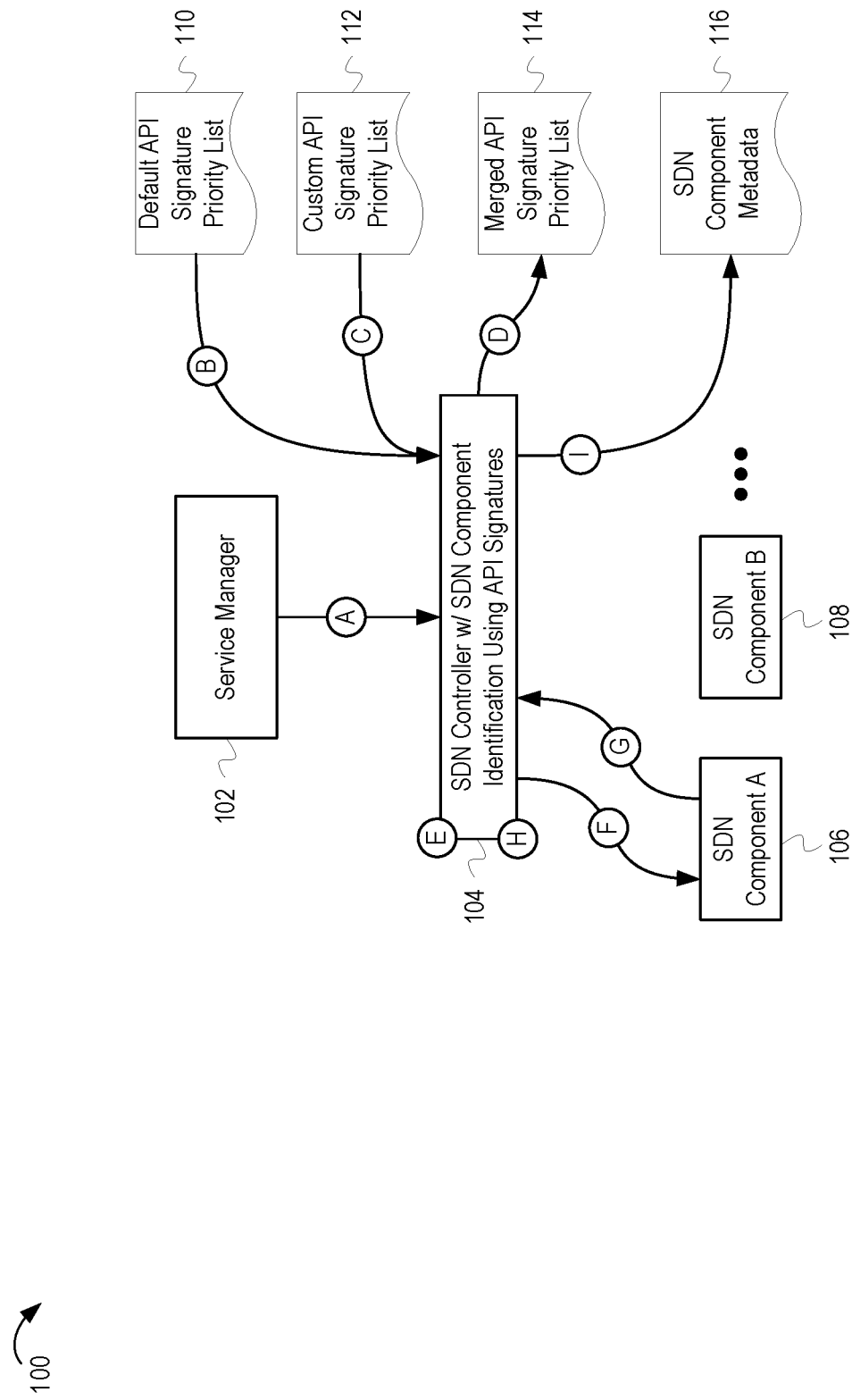
FIG. 1 depicts example operations of a network and an SDN controller configured to identify SDN components using API signatures.

The description that follows includes example systems, methods, techniques, and program flows that embody aspects of the disclosure. However, it is understood that this disclosure may be practiced without these specific details. For instance, this disclosure refers to Representational State Transfer-based services in illustrative examples. But aspects of this disclosure can be applied to other types of services. In other instances, well-known instruction instances, protocols, structures and techniques have not been shown in detail in order not to obfuscate the description.

One of the differences between a non-SDN components and SDN components is that the ability to access and control SDN components using an application programming interface (API). While SNMP is a mature protocol that is fairly standardized, there are many competing SDN implementations, each with its own API. There may even be variations within similar SDN implementations. For example, a particular vender may adopt a particular SDN protocol and add vender-specific functionality to their implementation of the SDN protocol. Thus, identifying an SDN component that has been added to a network may be more difficult than identifying a non-SDN component. However, this variability in SDN implementations can itself be utilized to identify SDN components.

To identify an SDN component, an SDN controller communicatively coupled with the SDN component can identify an API implemented by the SDN component by using API signatures. An API signature can include API functions/endpoints, parameter signatures, etc. For example, an API signature may include a list of Uniform Resource Identifiers (URIs) associated with a particular API or a particular set of parameters associated with a particular API function. In general, any information that may be used to identify a particular API can be included in an API signature.

To identify the API implemented by the SDN component, the SDN controller selects an API signature from a set of API signatures. The SDN controller tests the API of the SDN component to determine whether the API implemented by the SDN component exhibits the characteristics identified by the selected API signature. If the API implemented by the SDN component does not have the characteristics identified by the selected API signature, the SDN controller selects another API signature from the set of API signatures. The SDN controller continues to iterate over the set of API signatures until an API signature that corresponds to the API implemented by the SDN component is found. If no matching API signature is found, the SDN controller can indicate that the SDN component was not identifiable.

The particular operations performed by the SDN controller can vary depending on the characteristics identified by a selected API signature. For example, if the API signature identifies a URI representing an API endpoint, the SDN controller may send a message to the URI to determine whether the endpoint exists. If the API signature specifies that a corresponding API has a function that will return an error if a particular parameter is passed to the function, the SDN controller may call the function using an invalid parameter.

Identifying an SDN component by iteratively selecting API signatures from set of API signatures and determining whether the API implemented by the SDN component has the characteristics specified by the API signature can be a time consuming process. To reduce the amount of time taken to identify an SDN component, the SDN controller can select API signatures from the set of API signatures using priority-based techniques. For example, the SDN controller can select API signatures based on the probability of encountering a corresponding API. For example, if it is determined that a first API is used more frequently than a second API, the first API may be selected first.

Multiple priorities can be used to determine the order in which to select API signatures. For example, an administrator might have some knowledge of what APIs are most likely to be encountered in a particular environment and may thus configure the SDN controller to select certain API signatures first, overriding default priorities. Similarly, the SDN controller may dynamically determine the priority of various API signatures based on the identification of previous SDN components within a particular environment. For example, if the SDN controller previously identified several SDN components within a network as using a particular API, the SDN controller may select the corresponding API signature first when identifying new SDN components.

FIG. 1 depicts example operations of a network and an SDN controller configured to identify SDN components using API signatures. FIG. 1 depicts a network 100 including a service manager 102, an SDN controller with SDN component identification using API signatures (hereinafter "SDN controller") 104, an SDN component A 106, and an SDN component B 108. FIG. 1 also depicts data including a default API signature priority list 110, a custom API signature priority list 112, a merged API signature priority list 114, and SDN component metadata 116. The data may be stored in a database, on a storage device, etc.

At stage A, the SDN controller 104 receives a request to identify the APIs implemented by one or more of the SDN components of the network 100. The request may identify a specific SDN component by including a unique identifier associated with the particular SDN component (e.g., a network address or identifier that can be used to look up the network address). The request may identify a set of SDN components by specifying multiple unique identifiers. For example, to request that the APIs implemented by all SDN components of the network 100 be identified, the request may specify a range of network addresses associated with the network 100.

At stage B, the SDN controller 104 loads the default API signature priority list 110. The default API signature priority list 110 identifies one or more API signatures and priorities associated with each of the respective API signatures. The priorities can be implicit or explicit. For example, the default API signature priority list 110 may implicitly specify API signature priority by listing the API signatures in a particular order (e.g., from highest priority to lowest priority). To explicitly specify API signature priority, the default API signature priority list 110 may map a particular priority value (e.g., an integer) to each of the API signatures (e.g., high priority values may be associated with a higher priority). The default API signature priority list 110 can be read from a location accessible to the SDN controller 104, may be stored as part of the SDN controller 104 (e.g., "hardcoded"), may be received with the request at stage A, etc.

At stage C, the SDN controller 104 loads the custom API signature priority list 112. The custom API signature priority list 112 is similar to the default API signature priority list 110 in that it identifies one or more API signatures and priorities associated with each of the respective API signatures. It may specify the priorities in a manner similar to the default API signature priority list 110 or in a different manner. The custom API signature priority list 112 can be read from a location accessible to the SDN controller 104, may be stored as part of the SDN controller 104 (e.g., "hardcoded"), may be received with the request at stage A, etc.

The default API signature priority list 110 might specify API priorities based on "global" conditions. For example, API signatures may be prioritized in the default API signature priority list 110 based on the market share of SDN components that implement the API corresponding to the API signature. The custom API signature priority list 112 might specify API priorities based on "local" conditions. For example, an administrator of the network 100 may know that most of the SDN components on the network 100 use APIs that are not commonly used elsewhere. Thus, the administrator can use the custom API signature priority list 112 to override or otherwise adjust the API priorities in the default API signature priority list 110.

At stage D, the SDN controller 104 generates a merged API signature priority list 114. The particular operations performed by the SDN controller 104 to generate the merged API signature priority list 114 can vary. For example, in some implementations, any API signature priorities in the custom API signature priority list 112 will override the API signature priorities in the default API signature priority list 110. In some implementations, the custom API signature priority list 112 may specify amounts by which to "boost" the priority of a given API signature in the default API signature priority list 110. Once generated, the SDN controller 104 can store the merged API signature priority list 114 in memory, on a storage device, etc.

At stage E, the SDN controller 104 selects an API signature from a set of API signatures based, at least in part, on the merged API signature priority list 114. The particular operations performed by the SDN controller 104 to select the API signature can vary. For example, the merged API signature priority list 114 may select the API signature by selecting the API signature listed in the merged API signature priority list 114 as having the highest priority. If the merged API signature priority list 114 does not include the API signature itself, the SDN controller 104 may also read the API signature from a data source, such as a database or storage device (not depicted).

The API signature specifies a set of characteristics that identify a particular API or set of APIs. For example, the API signature may specify that the API corresponding to the API signature includes an endpoint at a specific URI, implements a particular function, etc. Each characteristic is generally associated with a particular action and an expected response. For example, if the characteristic is an endpoint, the action (which may be implicit) is to send a message to the endpoint. The expected response may be a response indicating that the endpoint exists or does not exist (for a negative characteristic). If the characteristic is a function, the action is to attempt to call the function. The expected response may be a response indicating success or failure. The API signature may also include metadata indicating the type of the service implementing the API (e.g., REST or SOAP-based).

At stage F, the SDN controller 104 selects a characteristic from the selected API signature and sends a message to SDN component A 106. The message can be generated and sent based, at least in part, on the selected characteristic, the type of service identified by the API signature, etc. The particular message sent can vary depending on the action associated with the characteristic (e.g., whether the characteristic is an endpoint characteristic, function characteristic, etc.).

At stage G, the SDN controller 104 receives a response to the message from SDN component A 106. As described above, the particular response can vary.

At stage H, the SDN controller 104 determines whether the API implemented by SDN component A 106 exhibits the selected characteristic. To determine whether the API implemented by SDN component A 106 exhibits the selected characteristic, the SDN controller 104 compares the response received at stage G to the expected response specified by the API signature. If the response received at stage G matches the expected response, the API implemented by SDN component A 106 exhibits the selected characteristic; if the response received at stage G does not match the expected response, the API implemented by SDN component A 106 does not exhibit the selected characteristic.

If the SDN controller 104 determines that the API implemented by SDN component A 106 exhibits the selected characteristic, the operations of stages F through H are performed again. If the SDN controller 104 determines that the API implemented by SDN component A 106 exhibits all characteristics of the selected API signature, the SDN controller 104 performs the operations at stage I. If the SDN controller 104 determines that the API implemented by SDN component A 106 does not exhibit the selected characteristic, the operations of stages E through H are performed again, but the SDN controller 104 selects a different, previously unselected API signature at stage E. In some implementations, subsequent API signatures selected at stage E are of equal or lesser priority than the previously selected API signature.

At stage I, the SDN controller 104 updates the SDN component metadata 116 to indicate that SDN component A 106 implements the API associated with the selected API signature. The particular updates performed by the SDN controller 104 can vary. For example, the SDN controller 104 may update a data structure to map SDN component A 106 to the API that corresponds to the API signature. In some instances, the SDN controller 104 may send an indication that SDN component A 106 implements the API corresponding to the API signature to the service manager 102, which may update the SDN component metadata 116.

If the request received at stage A indicated that multiple SDN components should be identified, the operations described at stages E through I are repeated for the other SDN components (e.g., SDN component B 108).

FIG. 1 is annotated with a series of letters, A through I. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

Figure 2:
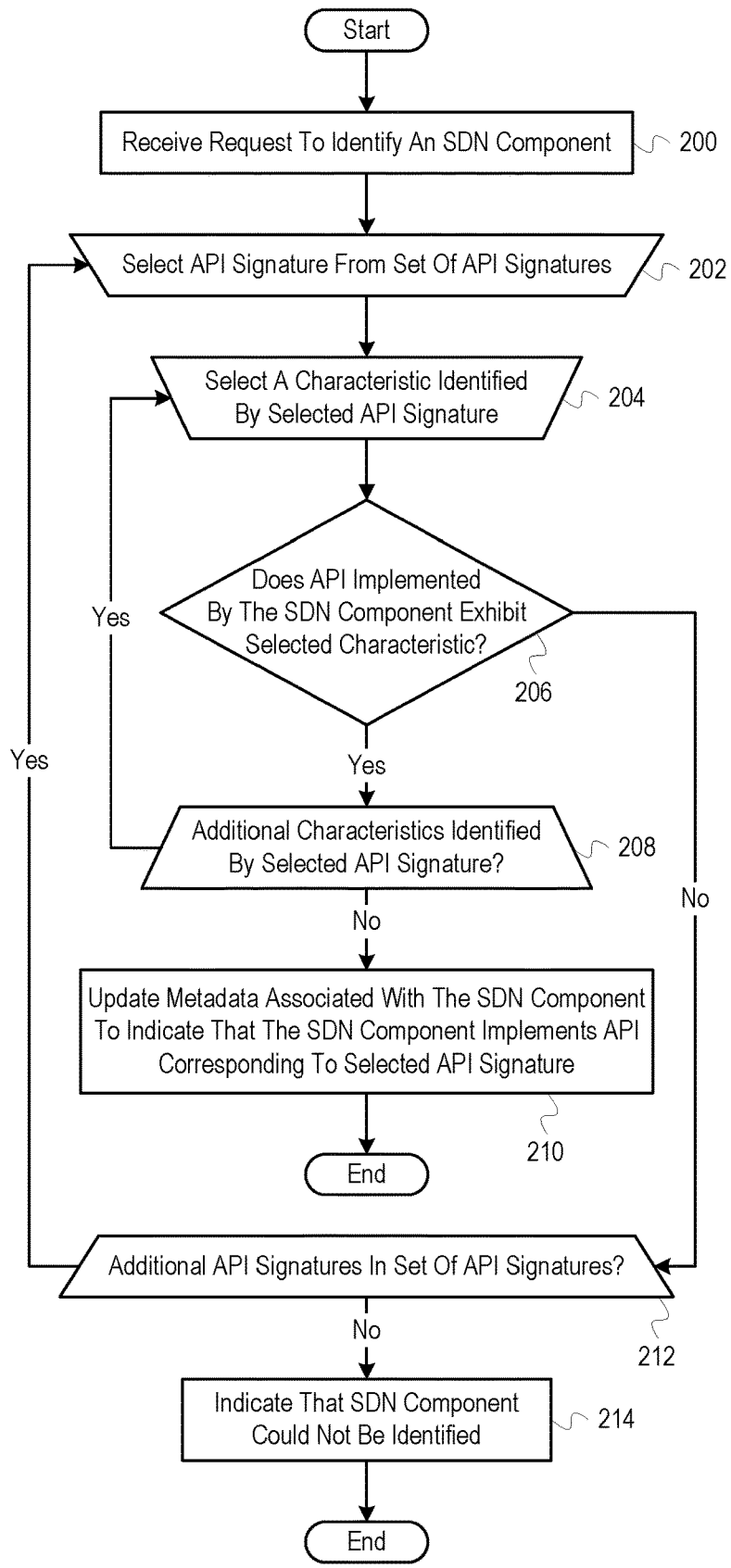
FIG. 2 depicts a flowchart of example operations for identifying an SDN component using a set of API signatures.

FIG. 2 depicts a flowchart of example operations for identifying an SDN component using a set of API signatures. The operations depicted in FIG. 2 can be performed by an SDN controller, such as SDN controller 104 of FIG. 1, or any suitable component.

An SDN controller initially receives a request to identify an SDN component (200). The request can be received from an administrator or another component. The request may include an identifier associated with the SDN component, such as a network address or other unique identifier. The request may be associated with a request to identify a set of components. For example, the SDN controller may receive a request to identify all SDN components of a particular network. In such a scenario, the SDN controller can iterate through components of the network (e.g., iterate through a list of IP addresses associated with the network) and generate a request to identify each of the components found on the network. Thus, the request received by the SDN controller at block 200 may be generated by the SDN controller or may be an implicit request associated with another request.

After receiving the request to identify the SDN component, the SDN controller selects an API signature from a set of API signatures (202). The particular technique used to select the API signature can vary. For example, the SDN controller may iterate through the set of API signatures in a sequential manner. As another example, the SDN controller may select API signatures based, at least in part, on a priority list (described in more detail below). The set of API signatures can be read from a data source accessible to the SDN controller, such as a database or file.

After selecting the API signature, the SDN controller selects a characteristic from a set of characteristics identified by the selected API signature (204). For example, the API signature may be a data structure that includes indications of particular characteristics. The indications of the particular characteristics may include a characteristic type (e.g., "endpoint", "function", etc.) and metadata specifying the particular characteristic (e.g., "/user/save", "save/user( )", etc.). The metadata that specifies a particular characteristic can vary depending on the characteristic type. For example, an endpoint characteristic may include a URI that identifies the location of the endpoint, while a parameter characteristic may include a particular parameter value and identify a particular expected result (e.g., an error response). The API signature may also include metadata specifying a particular protocol used for the corresponding API ("API type"). For example, the API signature may specify whether the API is SOAP or REST-based. On subsequent passes through block 204, the SDN controller selects a previously unselected characteristics identified by the selected API signature.

After selecting the characteristic, the SDN controller determines whether an API implemented by the SDN component exhibits the selected characteristic (206). The particular operations performed to determine whether the API implemented by the SDN component exhibits the selected characteristic can vary depending on the characteristic type, the API type, etc. For example, if the API signature specifies that the API is a REST-based API and that the selected characteristic is an endpoint, the SDN controller may send an HTTP GET message to a URI specified by the API signature. If the SDN controller receives an error message indicating that the endpoint does not exist (e.g., an HTTP 404 response), the SDN controller determines that the API implemented by the SDN component does not exhibit the selected characteristic. If the SDN controller receives a response indicating that the endpoint does exist (e.g., an HTTP 200 response), the SDN controller determines that the API implemented by the SDN component exhibits the selected characteristic. As another example, if the API signature specifies that the API is a SOAP-based API and that the use of a particular parameter when calling a particular API function will result in an error response, the SDN controller may send an HTTP POST message containing XML that identifies a particular API function and the particular parameter. If the SDN controller receives an error response, the SDN controller determines that the API implemented by the SDN component exhibits the selected characteristic. If the SDN controller does not receive an error response, the SDN controller determines that the API implemented by the SDN component does not exhibit the selected characteristic. If the SDN controller determines that the API implemented by the SDN component exhibits the selected characteristic, control flows to block 208. If the SDN controller determines that the API implemented by the SDN component does not exhibit the selected characteristic, control flows to block 212.

If the SDN controller determines that the API implemented by the SDN component exhibits the selected characteristic (206), the SDN controller determines whether additional characteristics that have not previously been selected are identified by the selected API signature (208). If the SDN controller determines that additional characteristics that have not been previously selected are identified by the selected API signature, control flows back to block 204. If the SDN controller determines that no additional characteristics that have not been previously selected are identified by the selected API signature, control flows to block 210.

If the SDN controller determines that the selected API signature does not identify any additional characteristics (208), the SDN controller updates metadata associated with the SDN component to indicate that the SDN component implements the API corresponding to the selected API signature (210). In other words, because the SDN component exhibited all characteristics specified by the selected API signature, the SDN controller determines that the SDN component implements the API corresponding to the selected API signature. The metadata may be a data structure that maps the SDN components to particular APIs, such as a mapping table. The metadata can be stored in a data source such as a database or a file. The data structure can be a database table. After updating the metadata associated with the SDN component to indicate that the SDN component implements the API corresponding to the selected API signature, the process ends.

If the SDN controller determined that the API implemented by the SDN component does not exhibit the selected characteristic (206), the SDN controller determines whether there are unselected API signatures in the set of API signatures (212). If there are unselected API signatures in the set of API signatures, control flows back to block 202. If there are no unselected API signatures in the set of API signatures, control flows to block 214.

If the SDN controller determined that there are no unselected API signatures in the set of API signatures (212), the SDN controller indicates that the SDN component could not be identified (214). The particular operations performed to indicate that the SDN component could not be identified can vary. For example, the SDN controller may generate and send an error response to a component from which the request to identify the SDN component originated. As another example, the SDN controller may notify an administrator that the SDN component could not be identified. After the SDN controller indicates that the SDN component could not be identified, the process ends.

In some implementations, the selected characteristic may be a "negative" characteristic. In other words, instead of determining whether the SDN component exhibits a particular characteristic, the SDN controller might determine whether the SDN component does not exhibit a particular characteristic. Thus, the SDN controller can use the lack of one or more characteristics to determine that an SDN component implements a particular API. The operations depicted in FIG. 2 can be adapted accordingly.

Figure 3:
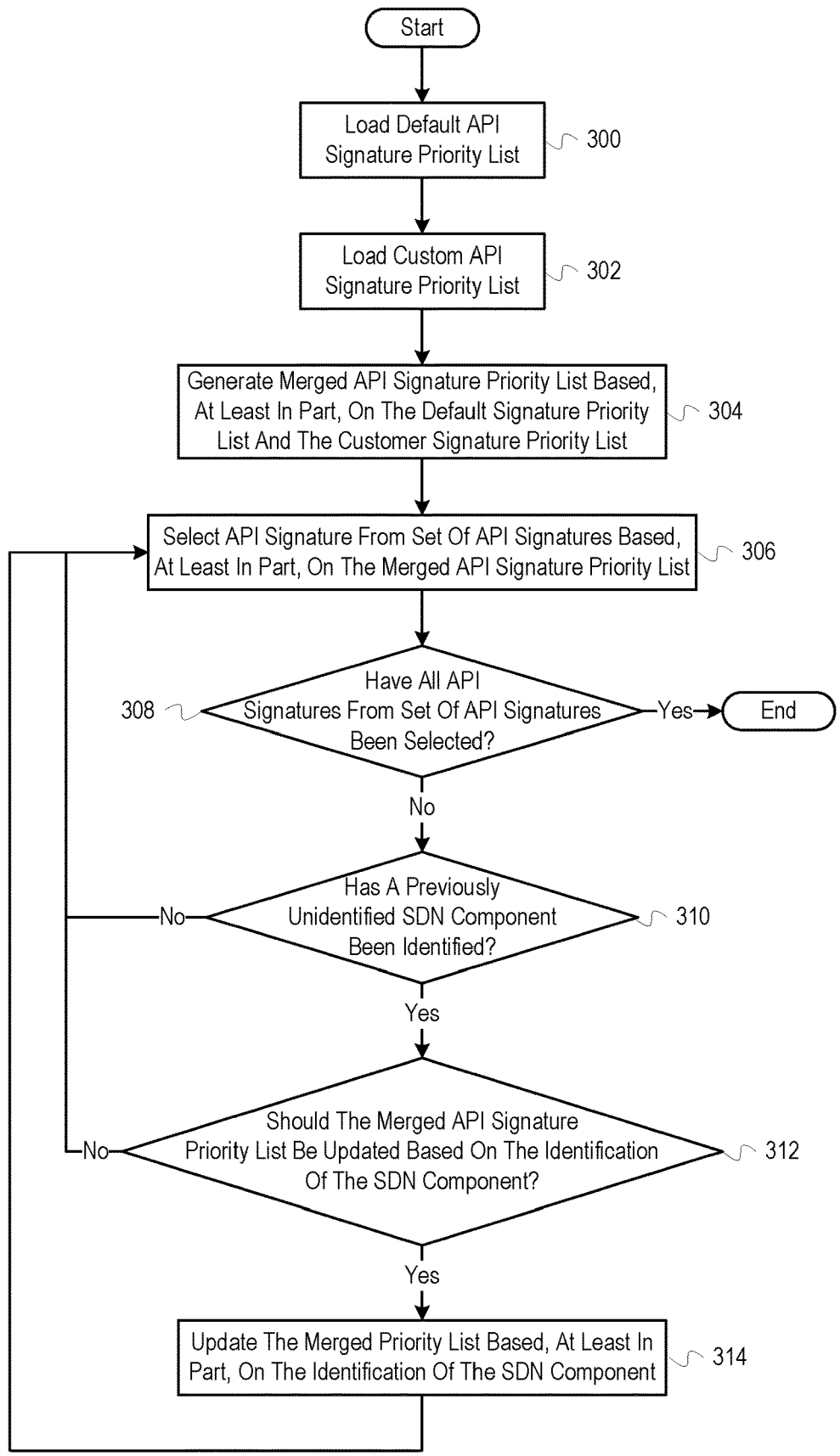
FIG. 3 depicts a flowchart of example operations for selecting an API signature from a set of API signatures using a priority list and dynamically updating the priority list.

FIG. 3 depicts a flowchart of example operations for selecting an API signature from a set of API signatures using a priority list and dynamically updating the priority list. The operations depicted in FIG. 3 can be performed by an SDN controller, such as SDN controller 104 of FIG. 1, or a suitable component.

Initially, an SDN controller loads a default API signature priority list (300). The default API signature priority list specifies a set of API signatures and associated priorities. The priorities can be explicit. For example, the default API signature priority list may identify a particular API signature and explicitly identify a specific priority value for the API signature (e.g., an integer value). The priorities may be implicit. For example, the default API signature priority list may specify API signatures in their priority order without explicitly identifying a specific priority value. In other words, an API signature appearing in the default API signature priority list may have a higher priority than an API signature appearing later in the default signature priority list.

Next, the SDN controller loads a custom API signature priority list (302). The custom API signature priority list specifies a set of API signatures and associated priorities, similar to the default API signature priority list. In some implementations, the particular technique used by the custom API signature priority list to specify priorities can differ from the technique used by the default API signature priority list.

Once the default API signature priority list and the custom API signature priority list are loaded, the SDN controller generates a merged API signature priority list (304). The particular operations performed to generate the merged API signature priority list can vary depending on the techniques used to specify the priorities in the default and custom API signature priority lists. For example, if both lists explicitly assign a priority value to individual API signatures, the SDN controller may generate the merged API signature priority list by replacing the priority values specified in the default API signature priority list with the priority values specified in the custom API signature priority list.

Once the merged API signature priority list is generated, the SDN controller selects an API signature from a set of API signatures based, at least in part, on the merged API signature priority list (306). In particular, the SDN controller selects an API signature from the set of API signatures based on the priority assigned to the API signature in the merged API signature priority list. For example, the merged API signature priority list may be sorted based on the priority of the API signatures. If the SDN controller is selecting an initial API signature, the SDN controller selects the first API signature in the merged API signature priority list. If the SDN controller is selecting a subsequent API signature, the SDN controller selects the API signature in the merged API signature priority list that comes after the previously selected API signature. If the merged API signature priority list does not contain all API signatures in the set of API signatures, the SDN controller might select any remaining API signatures after all API signatures specified in the merged API signature priority list have been selected.

After selecting an API signature from the set of API signatures, the SDN controller determines whether all API signatures from the set of API signatures have been selected (308). If the SDN controller determines that not all API signatures from the set of API signatures have been selected, control flows to block 310. If the SDN controller determines that all API signatures from the set of API signatures have been selected, the process ends.

If the SDN controller determined that not all API signatures from the set of API signatures have been selected (308), the SDN controller determines whether a previously unidentified SDN component has been identified (310). The SDN controller may determine that a previously unidentified SDN component has been identified by receiving an indication that the SDN component has been identified, determining that a particular variable indicates that the SDN component has been identified, etc. If the SDN controller determines that a previously unidentified SDN component has been identified, control flows to block 312. If the SDN controller determines that no previously unidentified SDN component has been identified, control flows back to block 306.

If the SDN controller determined that a previously unidentified SDN component has been identified (310), the SDN controller determines whether the merged API signature priority list should be updated based on the identification of the SDN component (312). The SDN controller may use various heuristics to determine whether the merged API signature priority list should be updated based on the identification of the SDN component. For example, the SDN controller may determine that the merged API signature priority list should be updated if the SDN component is the first SDN component identified, if the SDN component is the first SDN component identified as using a particular API, if a number of SDN components that use an API signature surpasses a threshold after identifying the SDN component, etc. If the SDN controller determines that the merged signature priority list should be updated based on the identification of the SDN component, control flows to block 314. If the SDN controller determines that the merged signature priority list should not be updated based on the identification of the SDN component, control flows back to block 312.

If the SDN controller determined that the merged signature priority list should be updated based on the identification of the SDN component (312), the SDN controller updates the merged priority list based, at least in part, on the identification of the SDN component (314). The particular operations performed by the SDN controller to update the merged priority list can vary. For example, if the SDN component is the first SDN component identified, the SDN controller may give the API signature associated with the SDN controller the highest priority. Additional heuristics for dynamically updating a priority list are discussed below. After the SDN controller updates the merged priority list, control flows back to block 306.

In some implementations, an SDN controller may use a single priority list (e.g., a default priority list), while some SDN controller implementations may use more than two priority lists. Similarly, some SDN controllers may not implement dynamic updating of a priority list based on identification of SDN components, while some SDN controllers may update a priority list based on other factors. The operations of FIG. 3 can be adapted accordingly.

Figure 4:
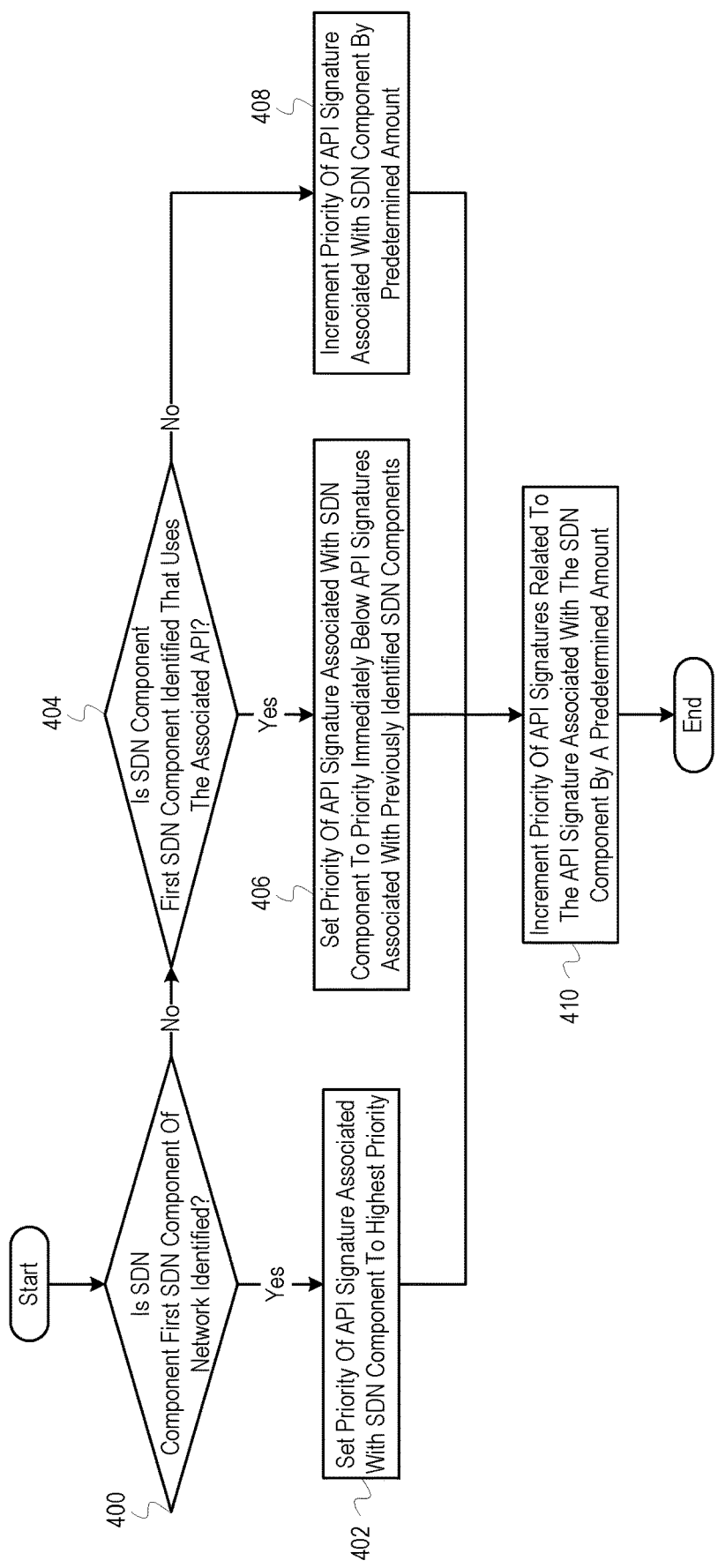
FIG. 4 depicts a flowchart of example operations for dynamically updating a priority list based on the identification of an SDN component.

FIG. 4 depicts a flowchart of example operations for dynamically updating a priority list based on the identification of an SDN component. The operations depicted in FIG. 4 can be performed by an SDN controller, such as the SDN controller 104 of FIG. 1, or any suitable component.

When an SDN component is identified, an SDN controller first determines whether the SDN component is the first SDN component of a network identified (400). The SDN controller can determine whether the SDN component is the first SDN component of the network identified by checking a flag indicating if any previous SDN components have been identified, checking a history of identified SDN components, etc. If the SDN controller determines that the SDN component is the first SDN component of the network identified, control flows to block 402. If the SDN controller determines that the SDN component is not the first SDN component of the network identified, control flows to block 404.

If the SDN controller determined that the SDN component is the first SDN component of the network identified (400), the SDN controller sets the priority of the API signature associated with the SDN component to the highest priority (402). In many cases, networks will be implemented using components that use similar APIs. Thus, increasing the priority of the API signature associated with the first SDN component identified effectively "assumes" that other SDN components of the network will use the same API. Thus, the API signature associated with the first SDN component identified will be the first selected API, potentially resulting in time savings if other SDN components of the network also use the same API.

If the SDN controller determined that the SDN component is not the first SDN component of the network identified (400), the SDN controller determines whether the SDN component is the first SDN component identified that uses the API associated with the SDN component (404). To determine whether the SDN component is the first SDN component identified that uses the API associated with the SDN component, the SDN controller may analyze a history of SDN component identifications. If the SDN controller determines that the SDN component is the first SDN component identified that uses the API associated with the SDN component, control flows to block 406. If the SDN controller determines that the SDN component is not the first SDN component identified that uses the API associated with the SDN component, control flows to block 408.

If the SDN controller determined that the SDN component is the first SDN component identified that uses the API associated with the SDN component (404), the SDN controller sets the priority of the API signature associated with the SDN component to the priority immediately below API signatures associated with previously identified SDN components (406). For example, assume that API signature A was associated with the first SDN component identified, and thus the priority of API signature A was set to the highest priority (404). If the next identified SDN component is associated with API signature B, control would flow through to block 406 and the priority of API signature B would be set to the priority immediately below the priority of API signature A. The reasoning for increasing the priority of the API signature in this case is similar to the reasoning for increasing the priority at block 402.

If the SDN controller determined that the SDN component is not the first SDN component identified that uses the API associated with the SDN component (404), the SDN controller increments the priority of the API signature associated with the SDN component by a predetermined amount (408). Incrementing the priority of a particular API signature each time an SDN component that uses the corresponding API is identified results in a higher priority for API signatures that are associated with more SDN components, thus potentially reducing the amount of time consumed identifying SDN components. In other words, this heuristic assumes that the more often an API is used by SDN components of a network, the more likely the API is to be used by unidentified components of the network.

After updating the priority of the API signature associated with the SDN component (402, 406, or 408), the SDN controller increments, by a predetermined amount, the priority of API signatures related to the API signature associated with the SDN component (410). Typically, the priority of the related API signatures is incremented by a predetermined amount that is less than the predetermined amount by which the priority of the API signature associated with the SDN component is incremented by. This heuristic captures the fact that many SDN components may use APIs that are similar to each other. For example, components from the same vender may use different versions of the same API. Thus, this heuristic assumes that if a particular API is used by an SDN component, it is more likely that a related API will be used by unidentified components of the network. Related API signatures can include API signatures associated with a particular hierarchy of API signatures, as discussed below. After the SDN controller increments the priority of API signatures related to the API signature associated with the SDN component, the process ends.

The heuristics used by an SDN controller to dynamically update a priority list based on the identification of an SDN component can vary. The heuristics depicted in FIG. 4 are examples, and SDN component implementations may implement a subset of the heuristics depicted in FIG. 4 and may implement additional heuristics not depicted. Further, the heuristics depicted in FIG. 4 may vary between implementations. For example, block 406 depicts the operation of setting the priority of an API signature to a priority immediately below that of API signatures associated with previously identified SDN components. In some implementations, the priority may not be set immediately below that of API signatures associated with previously identified SDN components. Instead, the priority may be set immediately below that of API signatures associated with SDN components with large market shares.

Figure 5:
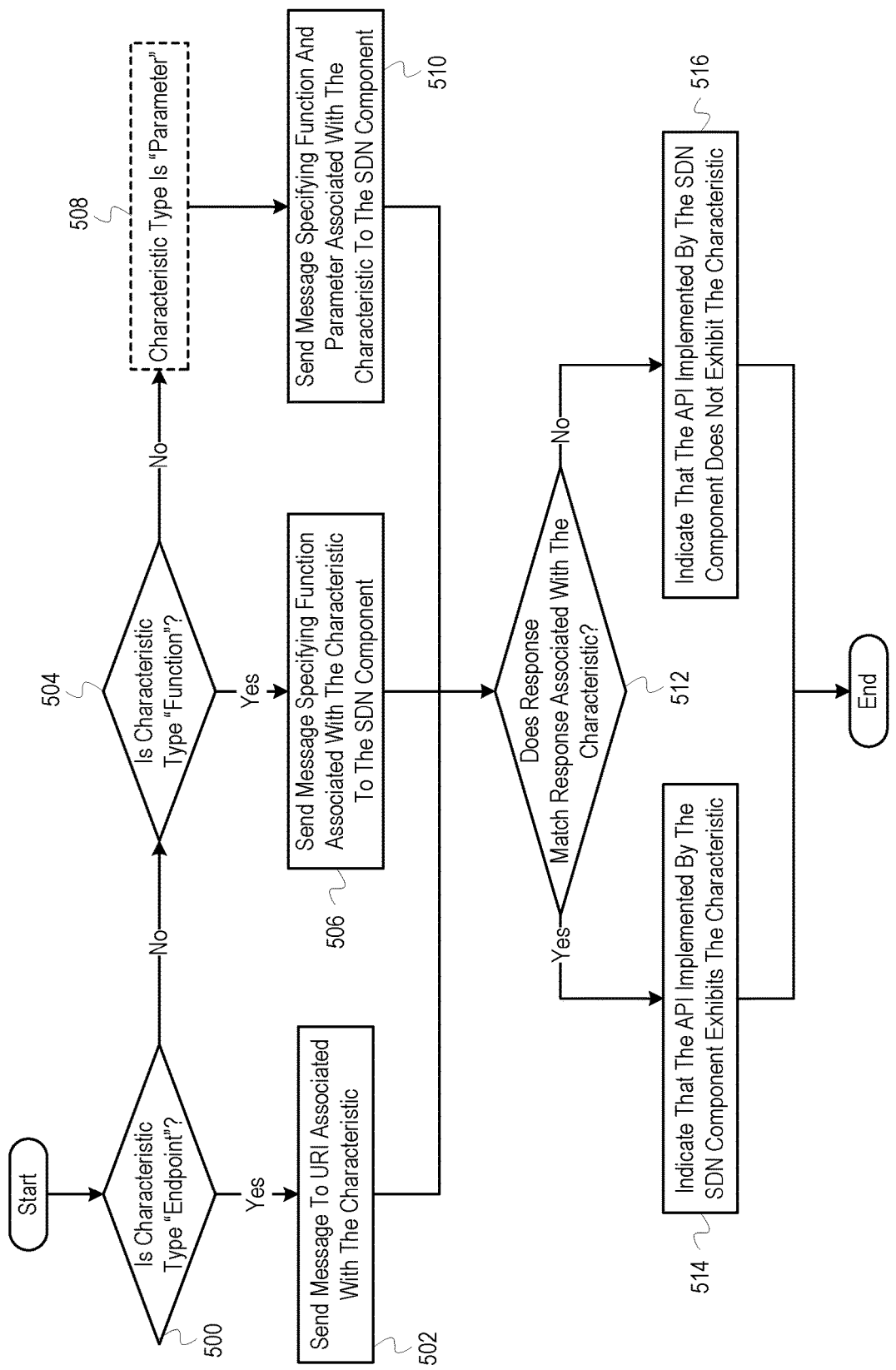
FIG. 5 depicts a flowchart of example operations for determining whether an API implemented by an SDN component exhibits a particular characteristic.

FIG. 5 depicts a flowchart of example operations for determining whether an API implemented by an SDN component exhibits a particular characteristic. The operations depicted in FIG. 5 can be performed by an SDN controller, such as the SDN controller 104 of FIG. 1, or any suitable component. The operations depicted in FIG. 5 assume that an API signature can include three characteristic types: "endpoint", "function", and "parameter", but can be adapted for API signatures that can include greater or fewer characteristic types.

After selecting a characteristic from an API signature (not depicted), the SDN controller determines whether the characteristic type is "endpoint" (500). To determine whether the characteristic type is "endpoint", the SDN controller can compare a characteristic type value specified by the API signature to a value that corresponds to the "endpoint" type. If the characteristic type value specified by the API signature is the same as the value that corresponds to the "endpoint" type, the SDN controller determines that the characteristic type is "endpoint". If the SDN controller determines that the characteristic type is "endpoint", control flows to block 502. If the SDN controller determines that the characteristic type is not "endpoint", control flows to block 504.

If the SDN controller determined that the characteristic type is "endpoint" (500), the SDN controller sends a message to a URI associated with the characteristic (502). The URI can be specified by the API signature.

If the SDN controller determined that the characteristic type is not "endpoint" (500), the SDN controller determines whether the characteristic type is "function" (504). To determine whether the characteristic type is "function", the SDN controller can compare a characteristic type value specified by the API signature to a value that corresponds to the "function" type. If the characteristic type value specified by the API signature is the same as the value that corresponds to the "function" type, the SDN controller determines that the characteristic type is "function". If the SDN controller determines that the characteristic type is "function", control flows to block 506. If the SDN controller determines that the characteristic type is not "function", control flows to block 508.

If the SDN controller determined that the characteristic type is "function" (504), the SDN controller sends a message specifying the function associated with the characteristic to the SDN component (506). The function can be specified by the API signature.

If the SDN controller determined that the characteristic type is not "function" (504), the SDN controller determines that the characteristic type is "parameter" (508). Because the API signature in this example only includes "endpoint", "function", and "parameter" characteristic types, the SDN controller determines that the characteristic type is "parameter" by the process of elimination, thus not performing an explicit operation to make the determination. In some implementations, however, the SDN controller may explicitly determine that the characteristic type is "parameter" in order to catch errors that may exist in the specification of the API signature.

If the SDN controller determined that the characteristic type is "parameter" (508), the SDN controller sends a message specifying the function and parameter associated with the characteristic to the SDN component (510). The function and the parameter can be specified by the API signature.

After the SDN controller sends a message to the SDN component (502, 506, or 510), the SDN controller receives a response from the SDN controller and determines whether the response matches the response associated with the characteristic (512). The response associated with the characteristic can vary depending on the characteristic type and can be implicit or explicit. If the characteristic type is "endpoint", the expected response associated with the characteristic is a response indicating that the endpoint specified by the URI associated with the characteristic exists (such as an HTTP 200 response). If the characteristic type is "function", the expected response associated with the characteristic is a response indicating that the function associated with the characteristic is implemented by the API of the SDN component. For example, the expected response may be any response other than a response indicating an error. If the characteristic type is "parameter", the expected response can vary. For example, the expected response may include a particular value, message, or error (e.g., an error indicating that the parameter is invalid). If the SDN controller determines that the response matches the response associated with the characteristic, control flows to block 514. If the SDN controller determines that the response does not match the response associated with the characteristic, control flows to block 516.

If the SDN controller determined that the response matched the response associated with the characteristic (512), the SDN controller indicates that the API implemented by the SDN component exhibits the characteristic (514). After the SDN controller indicates that the API implemented by the SDN component exhibits the characteristic, the process ends.

If the SDN controller determined that the response did not match the response associated with the characteristic (512), the SDN controller indicates that the API implemented by the SDN component does not exhibit the characteristic (516). After the SDN controller indicates that the API implemented by the SDN component exhibits the characteristic, the process ends.

As described above, APIs implemented by SDN components may be based on different service paradigms (e.g., SOAP or REST). If an SDN controller implementation supports communication with APIs that are based on different service paradigms, the SDN controller may also identify the service paradigm associated with the API signature prior to sending a message to the SDN component (e.g., at block 502, 506, or 510). The message may be constructed and sent in accordance with the identified service paradigm. The operations depicted in FIG. 5 can be adapted accordingly.

The particular arrangement of the characteristics in an API signature can vary. As an example, the characteristics can be arranged such that more general characteristics are selected before more specific characteristics. For example, consider API A. As API A is updated, some SDN components may still use older versions. Additionally, specific venders may modify API A to include functionality unique to the vender's SDN components. The set of API signatures may include an API signature for each version of the API A. The initial characteristic of API A may be a characteristic that differentiates API A from other APIs (e.g., API B and API C). The next set of characteristics may be characteristics that identify the particular version of API A being used.

Additionally, related API signatures may be arranged in a hierarchical manner. For example, the set of API signatures may include API signatures unique to particular APIs (e.g., API A, API B, and API C) but not include API signatures of individual versions of the APIs. Instead, the top level API signatures include characteristics shared by all versions of the individual APIs. For example, the API signature for API A may include characteristics that differentiate all versions of API A from API B and API C.

Once an SDN controller identifies a particular SDN component as implementing API A, API B, or API C based on the top level API signatures, the SDN controller can use a second level of API signatures to identify a specific version of the implemented API. For example, if the SDN controller identifies an SDN component as implementing API A, the SDN controller may load a set of API signatures for versions of API A (i.e., the second level of API signatures). The SDN controller can then iterate through the set of API signatures associated with versions of API A to identify the particular version of API A implemented by the SDN component. The number of levels in the hierarchy can vary depending on the number of versions of an API and the similarities between various versions. For example, if versions 1 and 1.1 of API A share some characteristics that distinguish the versions from version 2.0, the second level of API signatures may include a single API signature that corresponds to both versions 1 and 1.0. There may then be a third level of API signatures that identifies whether the version of API A implemented is version 1 or version 1.1. Such a hierarchical arrangement of API signatures may be used to reduce the number of API signatures that are iterated over before identifying the API implemented by a particular SDN component.

Figure 6:
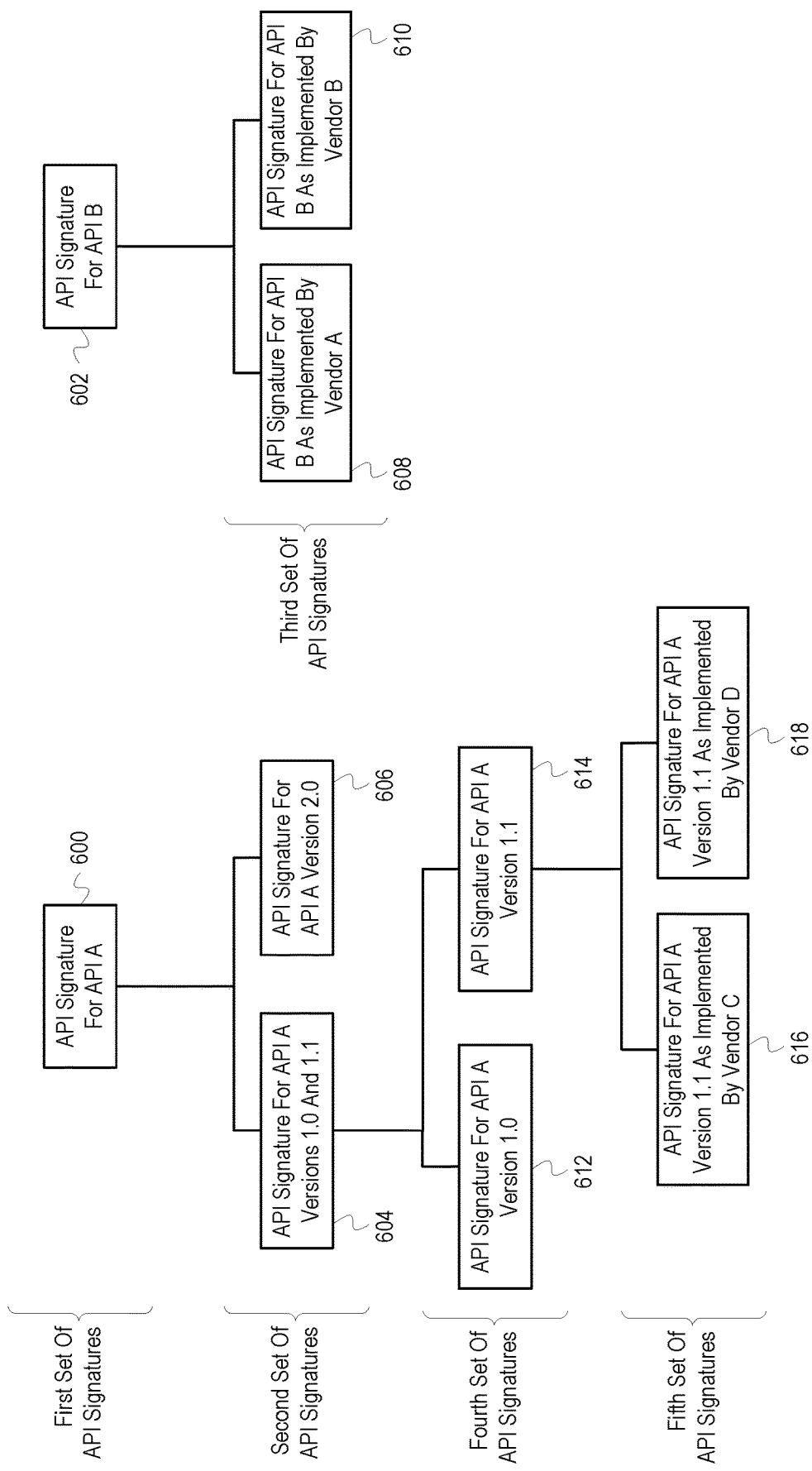
FIG. 6 depicts a hierarchical arrangement of API signatures.

FIG. 6 depicts a hierarchical arrangement of API signatures. In particular, FIG. 6 depicts two API signature hierarchies. The first API signature hierarchy includes API signatures 600, 604, 606, 612, 614, 606, and 618, which correspond to API A. The second API signature hierarchy includes API signatures 602, 608, and 610, which correspond to API B.

API signature 600 includes characteristics shared by all versions of API A that distinguish API A from API B. API signature 604 includes characteristics shared by versions 1.0 and 1.1 of API A that distinguish API A versions 1.0 and 1.1 from API A version 2.0. API signature 606 includes characteristics shared by all versions of API A version 2.0 that distinguish API A version 2.0 from API A versions 1.0 and 1.1. API signatures 612, 615, 616, and 618 similarly include characteristics that distinguish the corresponding API versions from other APIs versions at the same level of the hierarchy. API signatures 602, 608, and 610 function similarly for API B and its associated versions.

Each set of API signatures at the same level of the hierarchy that have the same parent form a set of API signatures. For example, API signatures 616 and 618 are at the fourth level of the hierarchy for API A and share the same parent API signature (API signature 614). If API signature 612 was a parent to API signatures, the API signatures that descend from API signature 612 would form a set of API signatures separate from the set of API signatures formed by API signatures 616 and 618.

Each API signature generally includes the minimum characteristics needed to distinguish the respective API signature from other API signatures in the same set of API signatures. For example, if the API corresponding to API signature 604 has ten characteristics that differ from the API corresponding to API signature 606, API signature 604 may include a single of the distinguishable characteristics.

An SDN controller may thus identify an API implemented by an SDN component with varying levels of specificity.

Figure 7:
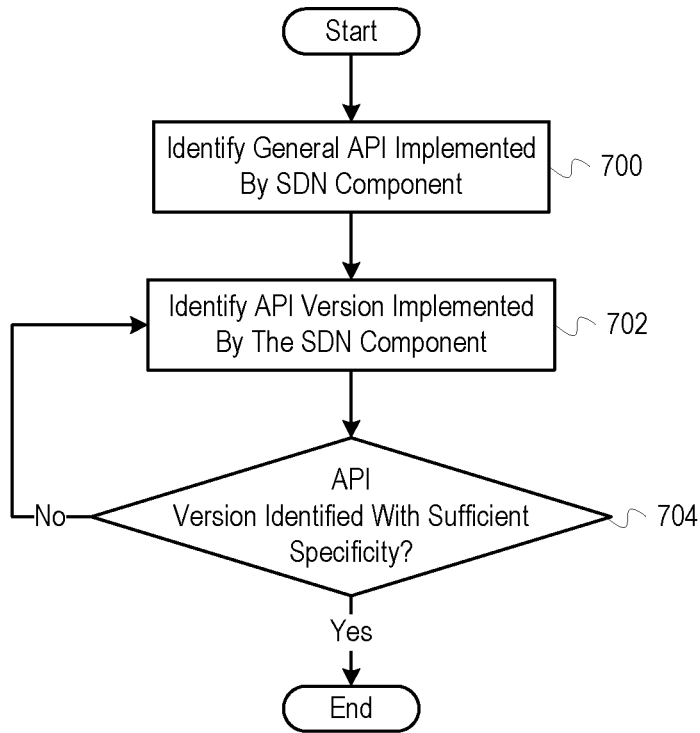
FIG. 7 depicts a flowchart of example operations for identifying an API implemented by an SDN component.

FIG. 7 depicts a flowchart of example operations for identifying an API implemented by an SDN component. The operations depicted in FIG. 7 can be performed by an SDN controller, such as the SDN controller 104 of FIG. 1, or any suitable component.

Initially, an SDN controller identifies the general API implemented by an SDN component (700). For example, if the SDN controller were using the API signature hierarchies of FIG. 6, identifying the general API implemented by the SDN component would be the equivalent to determining whether the API implemented by the SDN component matches the characteristics specified by API signature 600 (API A) or API signature 602 (API B).

Once the SDN controller identifies the general API implemented by the SDN component, the SDN controller identifies the API version implemented by the SDN component (702). For example, if the SDN controller were using the API signature hierarchies of FIG. 6 and identified the API as being API A (using API signature 600), identifying the API version implemented by the SDN component would be the equivalent to determining whether the API implemented by the SDN component matches the characteristics specified by API signature 604 (API signature for API A versions 1.0 and 1.1) or API signature 606 (API signature for API A version 2.0).

After identifying the API version implemented by the SDN component, the SDN controller determines whether the API version has been identified with sufficient specificity (704). If no hierarchy is used (e.g., the API signatures are "flat"), the API version has been identified with sufficient specificity if the API exhibits all characteristics of a particular API signature. If a hierarchy of API signatures is used, the API version has been identified with sufficient specificity if the API signature used at block 702 does not have any children. If the SDN controller determines that the API version has not been identified with sufficient specificity, control flows back to block 702. If the SDN controller determines that the API version has been identified with sufficient specificity, the process ends.

It should be noted that it may not be necessary to identify a specific API version. For example, if all versions of a particular API support the functionality used by the SDN controller, it may be sufficient for the SDN controller to determine that an SDN component implements a general API without determining the specific version of the API.

Figure 8:
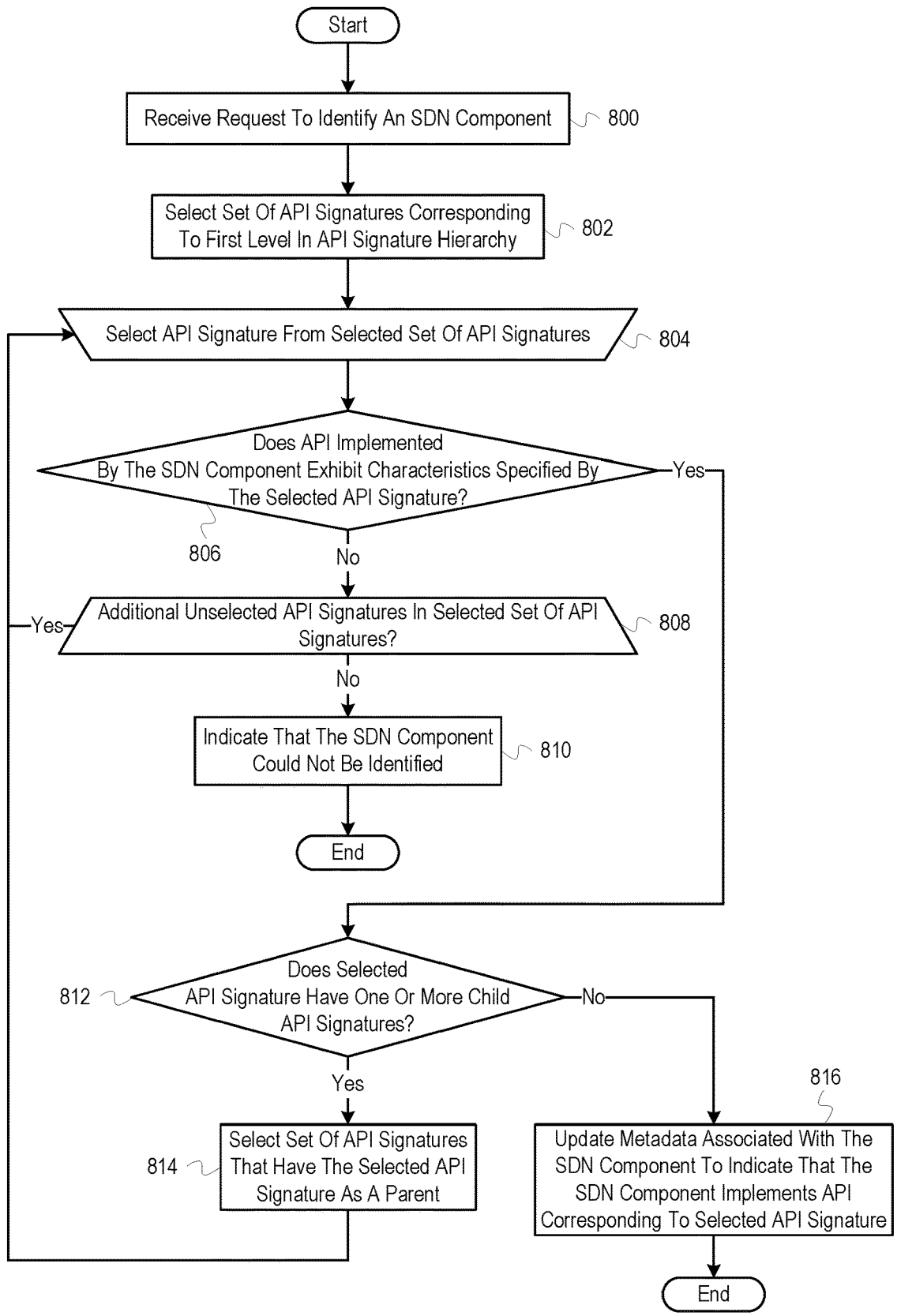
FIG. 8 depicts a flowchart of example operations for identifying an SDN component using hierarchical API signatures.

FIG. 8 depicts a flowchart of example operations for identifying an SDN component using hierarchical API signatures. The operations depicted in FIG. 8 can be performed by an SDN controller, such as the SDN controller 104 of FIG. 1, or any suitable component.

Initially, an SDN controller receives a request to identify an SDN component (800). The request can be substantially similar to the request discussed at block 200 of FIG. 2.

After receiving the request to identify the SDN component, the SDN controller selects a set of API signatures corresponding to the first level in an API signature hierarchy (802), such as that described above in relation to FIG. 6.

After selecting the set of API signatures that corresponds to the first level in the API signature hierarchy, the SDN controller selects an API signature from the selected set of API signatures (804). The operations performed by the SDN controller to select the API signature from the selected set of API signatures can be substantially similar to the operations described above in relation to block 202 of FIG. 2.

After selecting the API signature from the selected set of API signatures, the SDN controller determines whether an API implemented by the SDN component exhibits characteristics specified by the selected API signature (806). The operations performed by the SDN controller can be substantially similar to those described above in relation to blocks 204, 206, and 208 of FIG. 2. If the SDN controller determines that the API implemented by the SDN component exhibits the characteristics specified by the selected API signature, control flows to block 812. If the SDN controller determines that the API implemented by the SDN component does not exhibit the characteristics specified by the selected API signature, control flows to block 808.

If the SDN controller determined that the API implemented by the SDN component does not exhibit the characteristics specified by the selected API signature (806), the SDN controller determines whether there are additional unselected API signatures in the selected set of API signatures (808). If the SDN controller determines that there are additional unselected API signatures in the selected set of API signatures, control flows back to block 804. If the SDN controller determines that there are no additional unselected API signatures in the selected set of API signatures, control flows to block 810.

If the SDN controller determined that there are no unselected API signatures in the set of API signatures, the SDN controller indicates that the SDN component could not be identified (810). The operations performed by the SDN controller to indicate that the SDN component could not be identified can be substantially similar to those described in relation to block 214 of FIG. 2. After the SDN controller indicates that the SDN component could not be identified, the process ends.

If the SDN controller determined that the API implemented by the SDN component exhibits characteristics specified by the selected API signature (806), the SDN controller determines whether the selected API signature has one or more child API signatures (812). To determine whether the selected API signature has one or more child API signatures, the SDN controller can identify links to child API signatures associated with the selected API signature. The links to child API signatures may be included in the selected API signature itself or in metadata associated with the selected API signature. If the SDN controller identifies one or more links to child API signatures, the SDN controller determines that the selected API signature has one or more child API signatures. If the SDN controller determines that the selected API signature has one or more child API signatures, control then flows to block 814. If the SDN controller determines that the selected API signature does not have one or more child API signatures, control flows to block 816.

If the SDN controller determined that the selected API signature has one or more child API signatures (812), the SDN controller selects the child API signatures of the selected API signature as the next set of API signatures (814). The SDN controller can select the set of API signatures that are children of the selected API signature by traversing the links from the selected API signature to the child API signatures. After selecting the child API signatures, control flows back to block 804.

If the SDN controller determined that the selected API signature does not have one or more child API signatures (812), the SDN controller updates metadata associated with the SDN component to indicate that the SDN component implements the API corresponding to the selected API signature (816). The operations performed by the SDN controller to update the metadata can be substantially similar to those described above in relation to block 210 of FIG. 2. After the SDN controller updates the metadata associated with the SDN component to indicate that the SDN component implements the API corresponding to the selected API signature, the process ends.

Variations

Although the examples above depict the merging of a default priority list and a custom priority list to generate a merged priority list, other techniques can be used to modify the default priorities. For example, an SDN controller or other component may receive an indication of an API signature and a priority and, in response, update the default priority list to map the received priority to the API signature. As another example, the default priority list and the custom priority list may be included in a single file or data structure. For example, an entry in a priority list table may include an API signature identifier, a default priority, and a custom priority, as illustrated in Table 1, below. As another example, merging the default priority list and the custom priority list may not require explicitly generating a merged list. For example, software on an SDN controller may represent the default priority list and the custom priority list as hierarchical entities (e.g., objects). Requests for an API signature priority sent to the child entity (e.g., the entity representing the custom priority list) can determine whether the child entity includes the corresponding priority; if the child entity does not include the corresponding priority, the child entity can request the priority from the parent entity (e.g., the entity representing the default priority list).

TABLE 1

| API Signature Identifier | Default Priority | Custom Priority 1 | . . . |
|---|---|---|---|
| 519123 | 10 | 8 | |
| 889163 | 5 | 10 | |

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in block 206 can be performed in parallel or concurrently for different SDN components. With respect to FIG. 1, a service manager or priority lists are not necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 9:
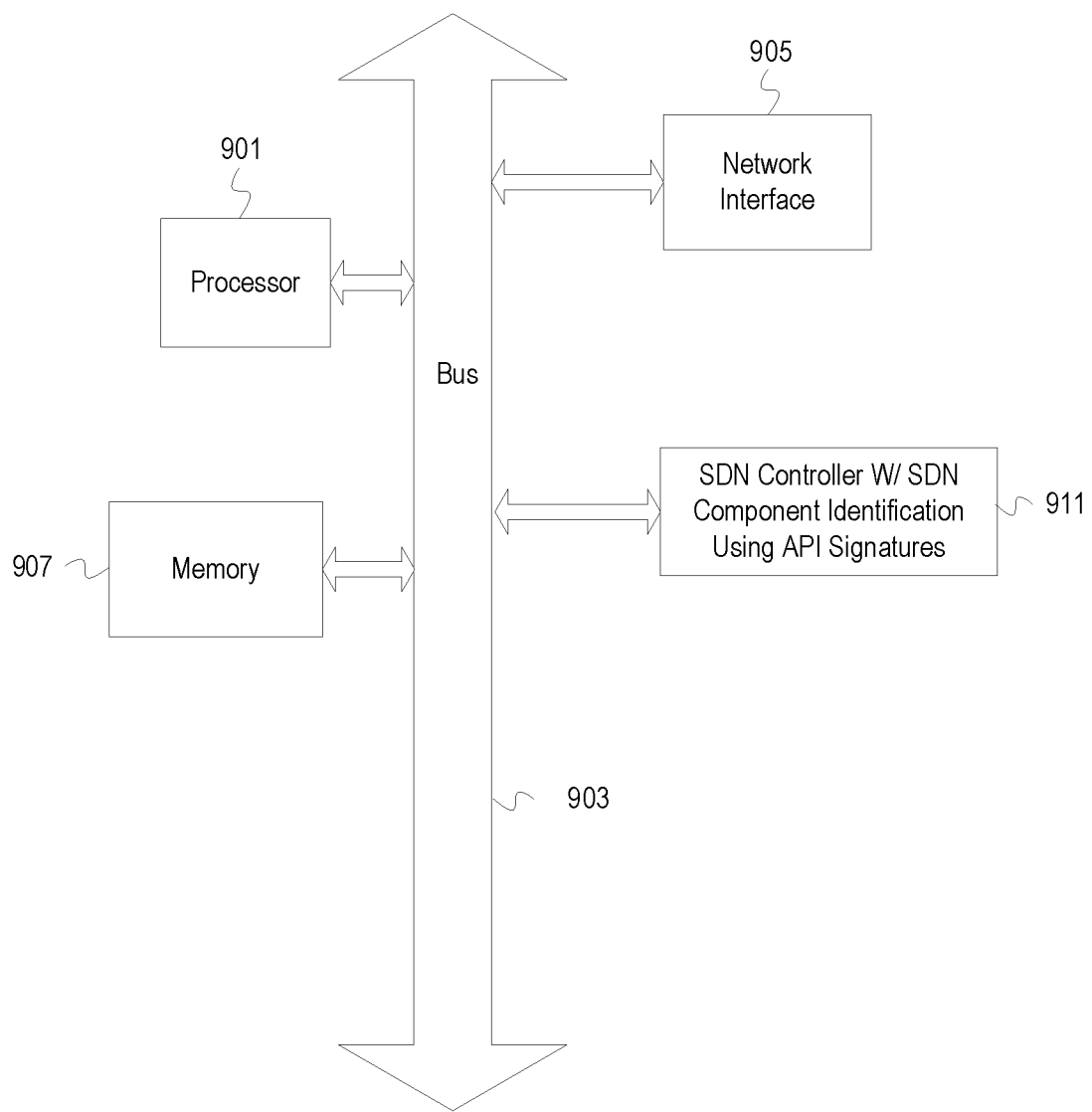
FIG. 9 depicts an example computer system with an SDN controller.

FIG. 9 depicts an example computer system with an SDN controller. The computer system includes a processor 901 (possibly including multiple processors, multiple cores, multiple nodes, and/or implementing multi-threading, etc.). The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport® bus, InfiniBand® bus, NuBus, etc.) and a network interface 905 (e.g., a Fiber Channel interface, an Ethernet interface, an internet small computer system interface, SONET interface, wireless interface, etc.). The system also includes an SDN controller 911. The SDN controller 911 iterates through one or more sets of API signatures, identifies one or more characteristics specified in the selected API signature, determines whether an API implemented by an SDN component exhibits the one or more characteristics, and identifies the API implemented by the SDN component based, at least in part, on whether the API exhibits the one or more characteristics. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

While the aspects of the disclosure are described with reference to various implementations and exploitations, it will be understood that these aspects are illustrative and that the scope of the claims is not limited to them. In general, techniques for network component discovery as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

As used herein, the term "SDN controller" applies to any component capable of performing the operations described herein and can include SDN orchestration systems, SDN devices, SDN gateways, SDN managers, etc. Further, the functionality described herein can be distributed across multiple components. In such scenarios, one or more of the multiple devices can be considered an SDN controller. For example, an SDN manager may query one or more SDN controllers, each of which may then query one or more SDN devices.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
   in response to a request to identify a networking component, selecting a first application programming interface (API) signature from a plurality of API signatures within a priority list that associates the first API signature with a corresponding first API type, wherein the first API signature includes a first characteristic;
   testing a first API implemented by the networking component to determine whether the first API implemented by the networking component exhibits the first characteristic; and
   determining that the networking component implements the first API type based on determining that the first API implemented by the networking component exhibits the first characteristic.

2. The method of claim 1, further comprising:
   mapping each of the plurality of API signatures to a respective priority; and
   wherein said selecting the first API signature comprises selecting the first API signature based on the mappings of each of the plurality of API signatures to a respective priority.

3. The method of claim 2, further comprising generating the priority list to include the mappings of each of the plurality of API signatures to a respective priority.

4. The method of claim 3, further comprising in response to determining that the first API exhibits the first characteristic, updating the priority associated with the first API signature in the priority list.

5. The method of claim 4, wherein updating the priority list comprises:
   determining whether the networking component is the first networking component of a network to be identified; and
   setting the priority associated with the first API signature based on a determination that the networking component is the first networking component of the network to be identified.

6. The method of claim 5, wherein updating the priority list comprises:
   determining that the networking component is the first networking component of the network to be identified that uses the first API; and
   based on determining that the networking component is the first networking component of the network to be identified that uses the first API, increasing the priority associated with the first API signature to a priority below the priority of a second API signature, wherein the second API signature was previously used to determine that another networking component implemented the second API.

7. The method of claim 6, wherein updating the priority list comprises incrementing the priority associated with the first API signature by a first predetermined amount, and wherein updating the priority list further comprises:
   determining that the second API signature is related to the first API signature; and
   in response to determining that the second API signature is related to the first API signature, incrementing the priority associated with the second API signature by a second predetermined amount.

8. One or more machine readable storage media having program code stored thereon, the program code to:
   in response to a request to identify a networking component, select a first application programming interface (API) signature from a plurality of API signatures within a priority list that associates the first API signature with a corresponding first API type, wherein the first API signature includes a first characteristic;
   test a first API implemented by the networking component to determine whether the first API implemented by the networking component exhibits the first characteristic; and
   determine that the networking component implements the first API type based on determining that the first API implemented by the networking component exhibits the first characteristic.

9. The machine readable storage media of claim 8, wherein the program code further comprises program code to:
   map each of the plurality of API signatures to a respective priority; and
   wherein said selecting the first API signature comprises selecting the first API signature based on the mappings of each of the plurality of API signatures to a respective priority.

10. The machine readable storage media of claim 9, wherein the program code further comprises program code to generate the priority list to includes the mappings of each of the plurality of API signatures to a respective priority.

11. The machine readable storage media of claim 10, wherein the program code further comprises program code to, in response to determining that the first API exhibits the first characteristic, update the priority associated with the first API signature in the priority list.

12. The machine readable storage media of claim 11, wherein the program code to update the priority list comprises program code to:
    determine whether the networking component is the first networking component of a network to be identified; and
    set the priority associated with the first API signature based on a determination that the networking component is the first networking component of the network to be identified.

13. The machine readable storage media of claim 12, wherein the program code to update the priority list comprises program code to:
    determine that the networking component is the first networking component of the network to be identified that uses the first API; and
    based on determining that the networking component is the first networking component of the network to be identified that uses the first API, increase the priority associated with the first API signature to a priority below the priority of a second API signature, wherein the second API signature was previously used to determine that another networking component implemented the second API.

14. The machine readable storage media of claim 13, wherein the program code to update the priority list comprises program code to increment the priority associated with the first API signature by a first predetermined amount, and wherein the program code to update the priority list comprises program code to:

determine that the second API signature is related to the first API signature; and in response to determining that the second API signature is related to the first API signature, increment the priority associated with the second API signature by a second predetermined amount.

15. An apparatus comprising:
a processor; and
a machine readable medium having program code stored thereon, the program code executable by the processor to cause the apparatus to:
in response to a request to identify a networking component, select a first application programming interface (API) signature from a plurality of API signatures within a priority list that associates the first API signature with a corresponding first API type, wherein the first API signature includes a first characteristic;
test a first API implemented by the networking component to determine whether the first API implemented by the networking component exhibits the first characteristic; and
determine that the networking component implements the first API type based on determining that the first API implemented by the networking component exhibits the first characteristic.

16. The apparatus of claim 15, wherein the program code further comprises program code to cause the apparatus to:
map each of the plurality of API signatures to a respective priority; and
wherein said selecting the first API signature comprises selecting the first API signature based on the mappings of each of the plurality of API signatures to a respective priority.

17. The apparatus of claim 16, wherein the program code further comprises program code to cause the apparatus to generate the priority list to includes the mappings of each of the plurality of API signatures to a respective priority.

18. The apparatus of claim 17, wherein the program code further comprises program code to cause the apparatus to, in response to determining that the first API exhibits the first characteristic, update the priority associated with the first API signature in the priority list.

19. The apparatus of claim 18, wherein the program code to cause the apparatus to update the priority list comprises program code to cause the apparatus to:
determine whether the networking component is the first networking component of a network to be identified; and
set the priority associated with the first API signature based on a determination that the networking component is the first networking component of the network to be identified.

20. The apparatus of claim 19, wherein the program code to cause the apparatus to update the priority list comprises program code to cause the apparatus to:
determine that the networking component is the first networking component of the network to be identified that uses the first API; and
based on determining that the networking component is the first networking component of the network to be identified that uses the first API, increase the priority associated with the first API signature to a priority below the priority of a second API signature, wherein the second API signature was previously used to determine that another networking component implemented the second API.

* * * * *